(12) United States Patent
Pan et al.

(10) Patent No.: US 11,800,457 B2
(45) Date of Patent: Oct. 24, 2023

(54) WIRELESS COMMUNICATION METHOD AND DEVICE, AND NETWORK DEVICE

(71) Applicant: VIVO MOBILE COMMUNICATION CO., LTD., Guangdong (CN)

(72) Inventors: Xueming Pan, Chang'an Dongguan (CN); Xiaodong Shen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/980,743

(22) Filed: Nov. 4, 2022

(65) Prior Publication Data
US 2023/0056341 A1    Feb. 23, 2023

Related U.S. Application Data

(60) Division of application No. 17/094,684, filed on Nov. 10, 2020, now Pat. No. 11,523,348, which is a (Continued)

(30) Foreign Application Priority Data

May 11, 2018    (CN) .......................... 201810450490.3

(51) Int. Cl.
*H04B 7/185* (2006.01)
*H04W 52/14* (2009.01)
(Continued)

(52) U.S. Cl.
CPC ....... *H04W 52/146* (2013.01); *H04W 52/367* (2013.01); *H04W 52/46* (2013.01); *H04W 88/14* (2013.01)

(58) Field of Classification Search
CPC . H04W 52/146; H04W 52/367; H04W 52/46; H04W 88/14; H04W 56/001;
(Continued)

(56) References Cited

U.S. PATENT DOCUMENTS 5,499,395 A * 3/1996 Doi ...................... H04W 16/08
370/328
2008/0045157 A1    2/2008 Takahashi
(Continued)

FOREIGN PATENT DOCUMENTS

CN    105530692 A    4/2016
EP    3 720 200 A1    10/2020
(Continued)

OTHER PUBLICATIONS

Huawei, et al., "Physical layer enhancement on IAB," 3GPP TSG RAN WG1 Meeting #92bis, R1-1803695, pp. 1-6, (Apr. 16-20, 2018).

(Continued)

*Primary Examiner* — Phuongchau Ba Nguyen
(74) *Attorney, Agent, or Firm* — Maschoff Brennan

(57) ABSTRACT

Embodiments of the present disclosure provide a wireless communication method and device, and a network device. A wireless communication method includes: determining a target reception power value; performing control on at least one of a first transmission power or a second transmission power according to the target reception power value, thereby enabling a difference between a first reception power and a second reception power to be less than a preset power threshold. A wireless communication method includes: determining a reference time; performing control on at least one of a first transmission time or a second transmission time according to the reference time, thereby enabling a difference between a first reception time and a second reception time to be less than a preset time difference.

19 Claims, 5 Drawing Sheets receiving a target reception power value and/or a first power adjustment instruction transmitted by a relay node of the donor gNB — 501 according to the target reception power value and/or the first power adjustment instruction, adjusting a first transmission power — 502

Related U.S. Application Data continuation of application No. PCT/CN2019/085107, filed on Apr. 30, 2019.

(51) Int. Cl.
  *H04W 52/36* (2009.01)
  *H04W 52/46* (2009.01)
  *H04W 88/14* (2009.01)

(58) Field of Classification Search
  CPC .......... H04W 56/0015; H04W 52/143; H04W 52/242; H04W 52/12; H04W 52/14; H04W 52/18; H04W 52/24; H04W 52/245; H04W 84/047; H04W 56/00; H04W 52/50; H04W 52/16
  See application file for complete search history.

(56) References Cited

U.S. PATENT DOCUMENTS

| | | |
|---|---|---|
| 2009/0203309 A1 | 8/2009 | Okuda |
| 2011/0128883 A1 | 6/2011 | Chung et al. |
| 2011/0299614 A1 | 12/2011 | Kim et al. |
| 2012/0044841 A1 | 2/2012 | Chen et al. |
| 2012/0058759 A1* | 3/2012 | Lundborg ............ H04W 24/08 455/424 |
| 2012/0230249 A1 | 9/2012 | Fukumoto et al. |
| 2012/0294172 A1 | 11/2012 | Adachi |
| 2012/0309291 A1 | 12/2012 | Sawai |
| 2012/0327794 A1 | 12/2012 | Han et al. |
| 2013/0012259 A1 | 1/2013 | Furuskar et al. |
| 2013/0150116 A1* | 6/2013 | Nakamura .......... H04W 52/367 455/522 |
| 2013/0188507 A1 | 7/2013 | Dayal et al. |
| 2013/0279399 A1 | 10/2013 | Wilhelmsson et al. |
| 2014/0016541 A1 | 1/2014 | Kim et al. |
| 2015/0208383 A1 | 7/2015 | Fujishiro |
| 2016/0073370 A1 | 3/2016 | Axmon et al. |
| 2016/0249302 A1 | 8/2016 | Uchiyama et al. |
| 2020/0053655 A1 | 2/2020 | Ghosh et al. |
| 2020/0336986 A1 | 10/2020 | Chen et al. |

FOREIGN PATENT DOCUMENTS

| | | |
|---|---|---|
| EP | 3 840 487 A1 | 6/2021 |
| JP | 2009-188839 A | 8/2009 |
| JP | 2010-109914 A | 5/2010 |
| JP | 2012-244213 A | 12/2010 |
| JP | 2011-529663 A | 12/2011 |
| KR | 10-2013-0006879 A | 1/2013 |
| WO | 2011/058991 A1 | 5/2011 |
| WO | 2014/017504 A1 | 1/2014 |
| WO | 2019/144841 A1 | 8/2019 |
| WO | 2019/208994 A1 | 10/2019 |
| WO | 2020/064027 A2 | 4/2020 |

OTHER PUBLICATIONS

Nokia, et al., "IAB timing," 3GPP TSG RAN WG1 Meeting #92bis, R1-1804624, pp. 1-5, (Apr. 16-20, 2018).

Huawei, et al., "Physical layer design for NR IAB," 3GPP TSG RAN WG1 Meeting #94, R1-1808101, pp. 1-14, (Aug. 20-24, 2018).

Partial Supplementary European Search Report dated May 26, 2021 as received in Application No. 19800341.0.

KR Office Action dated Jun. 23, 2021 as received in Application No. 10-2020-7035430.

AU Patent Examination Report No. 1 dated Jul. 9, 2021 as received in Application No. 2019266680.

Extended European Search Report dated Aug. 18, 2021 as received in Application No. 19800341.0.

IN Patent Examination Report dated Dec. 10, 2021 as received in Application No. 202027051931.

JP Office Action dated Dec. 13, 2021 as received in Application No. 2020-563562.

JP Office Action dated Jan. 30, 2023 as received in Application No. 2022-039233.

* cited by examiner

WIRELESS COMMUNICATION METHOD AND DEVICE, AND NETWORK DEVICE

CROSS-REFERENCE TO RELATED APPLICATION

This application is a divisional application of U.S. patent application Ser. No. 17/094,684 which is a continuation application of International Application No. PCT/CN2019/085107 filed on Apr. 30, 2019, which claims the priority of Chinese Application No. 201810450490.3, filed on May 11, 2018, both of which are incorporated herein by reference in their entireties.

TECHNICAL FIELD

The present disclosure relates to the field of communications technology, and in particular to a wireless communication method and device, and a network device.

BACKGROUND

The relay technology is a wireless communication technology in which one or more relay nodes are added between a base station and a terminal device which is also known as user equipment (UE), and the relay node forwards radio signals one or more times. In a typical application scenario of a relay system, as shown in FIG. 1, the application scenario includes: a donor gNB 101, a relay node 102, and a terminal device 103. A cell served by the donor gNB 101 is referred to as a donor cell. A cell served by the relay node 102 is referred to as a relay cell. A communication link between the donor gNB 101 and the relay node 102 is referred to as a backhaul link, which is also known as backhaul or backhaul link. A communication link between the relay node 102 and the terminal device 103 that accesses a relay cell is referred to as an access link.

In the related art, a time division multiplexing (TDM) scheme is adopted to ensure that the relay node can normally receive and transmit signals in a half-duplex operation mode.

However, since four slots are required to complete a bidirectional signal transmission between the donor gNB and the terminal device, and the donor gNB and the terminal device are idle for half of the time, it will cause a large transmission delay and low system communication efficiency.

SUMMARY

An object of embodiments of the present disclosure is to provide a wireless communication method and device, and a network device.

A first aspect of the present disclosure provides a wireless communication method, operable by a relay node, including:

determining a target reception power value;

performing control on at least one of a first transmission power or a second transmission power according to the target reception power value, thereby enabling a difference between a first reception power and a second reception power to be less than a preset power threshold;

wherein the first transmission power is a transmission power of a backhaul downlink (DL) signal transmitted by a donor gNB of the relay node to the relay node;

the second transmission power is a transmission power of an access uplink (UL) signal transmitted by a terminal device to the relay node;

the first reception power is a reception power when the backhaul DL signal from the donor gNB reaches the relay node;

the second reception power is a reception power when the access UL signal from the terminal device reaches the relay node.

A second aspect of the present disclosure provides a wireless communication method, operable by a donor gNB, including:

receiving at least one of a target reception power value or a first power adjustment instruction transmitted by a relay node of the donor gNB;

according to at least one of the target reception power value or the first power adjustment instruction, adjusting a first transmission power;

wherein the first transmission power is a transmission power of a backhaul downlink (DL) signal transmitted by the donor gNB to the relay node;

the target reception power value is used by the donor gNB to determine the first transmission power; the first transmission power is determined by the target reception power value and a path loss of a backhaul link between the relay node and the donor gNB; the backhaul DL signal is transmitted on the backhaul link;

the first power adjustment instruction is configured to instruct the donor gNB to increase or decrease the first transmission power, thereby enabling a difference between the first reception power and the target reception power value to be less than a preset power threshold;

the first reception power is a reception power when the backhaul DL signal from the donor gNB reaches the relay node.

A third aspect of the present disclosure provides a wireless communication method, operable by a relay node, including:

determining a reference time;

performing control on at least one of a first transmission time or a second transmission time according to the reference time, thereby enabling a difference between a first reception time and a second reception time to be less than a preset time difference;

wherein the first transmission time is a transmission time of a backhaul downlink (DL) signal transmitted by a donor gNB of the relay node to the relay node;

the second transmission time is a transmission time of an access uplink (UL) signal transmitted by a terminal device to the relay node;

the first reception time is a moment when the backhaul DL signal from the donor gNB reaches the relay node;

the second reception time is a moment when the access UL signal from the terminal device reaches the relay node.

A fourth aspect of the present disclosure provides a wireless communication method, operable by a donor gNB, including:

receiving a first time adjustment instruction transmitted by a relay node of the donor gNB;

adjusting first transmission time according to the first time adjustment instruction;

wherein the first transmission time is a transmission time of a backhaul downlink (DL) signal transmitted by the donor gNB to the relay node;

the first time adjustment instruction is configured to instruct the donor gNB to advance or delay the first transmission time, thereby enabling the difference between the first reception time and the reference time determined by the relay node to be less than the preset time difference;

the first reception time is a moment when the backhaul DL signal from the donor gNB reaches the relay node.

A fifth aspect of the present disclosure provides a wireless communication device, applied to a relay node, including:

a first determining unit configured to determine a target reception power value;

a first control unit configured to, according to the target reception power value, perform control on at least one of a first transmission power or a second transmission power, thereby enabling a difference between a first reception power and a second reception power to be less than a preset power threshold;

wherein the first transmission power is a transmission power of a backhaul downlink (DL) signal transmitted by a donor gNB of the relay node to the relay node;

the second transmission power is a transmission power of an access UL signal transmitted by a terminal device to the relay node;

the first reception power is a reception power when the backhaul DL signal from the donor gNB reaches the relay node;

the second reception power is a reception power when the access UL signal from the terminal device reaches the relay node A sixth aspect of the present disclosure provides a wireless communication device, applied to a donor gNB, including:

a second receiving unit configured to receive at least one of a target reception power value or a first power adjustment instruction transmitted by a relay node of the donor gNB;

a first adjustment unit configured to adjust a first transmission power according to at least one of the target reception power value or the first power adjustment instruction;

wherein the first transmission power is a transmission power of a backhaul downlink (DL) signal transmitted by the donor gNB to the relay node;

the target reception power value is used by the donor gNB to determine the first transmission power; the first transmission power is determined by the target reception power value and a path loss of a backhaul link between the relay node and the donor gNB; the backhaul DL signal is transmitted on the backhaul link;

the first power adjustment instruction is configured to instruct the donor gNB to increase or decrease the first transmission power, thereby enabling a difference between the first reception power and the target reception power value to be less than a preset power threshold;

the first reception power is a reception power when the backhaul DL signal from the donor gNB reaches the relay node.

A seventh aspect of the present disclosure provides a wireless communication device, applied to a relay node, including:

a second determining unit configured to determine a reference time;

a second control unit configured to, according to the reference time, perform control on at least one of a first transmission time or a second transmission time, thereby enabling a difference between a first reception time and a second reception time to be less than a preset time difference;

wherein the first transmission time is a transmission time of a backhaul downlink (DL) signal transmitted by a donor gNB of the relay node to the relay node;

the second transmission time is a transmission time of an access uplink (UL) signal transmitted by a terminal device to the relay node;

the first reception time is a moment when the backhaul DL signal from the donor gNB reaches the relay node;

the second reception time is a moment when the access UL signal from the terminal device reaches the relay node.

An eighth aspect of the present disclosure provides a wireless communication device, applied to a donor gNB, including:

a third receiving unit configured to receive a first time adjustment instruction transmitted by a relay node of the donor gNB;

a second adjustment unit configured to adjust first transmission time according to the first time adjustment instruction;

wherein the first transmission time is a transmission time of a backhaul downlink (DL) signal transmitted by the donor gNB to the relay node;

the first time adjustment instruction is configured to instruct the donor gNB to advance or delay the first transmission time, thereby enabling a difference between the first reception time and the reference time determined by the relay node to be less than the preset time difference;

the first reception time is a moment when the backhaul DL signal from the donor gNB reaches the relay node.

A ninth aspect of the present disclosure provides a network device, including a memory, a processor, and a program stored on the memory and executable on the processor; wherein the program is executed by the processor to implement steps of the wireless communication method applied to the relay node.

A tenth aspect of the present disclosure provides a network device, including: a memory, a processor, and a program stored on the memory and executable on the processor; wherein the program is executed by the processor to implement steps of the wireless communication method applied to the donor gNB.

An eleventh aspect of the present disclosure provides a computer readable storage medium, including: a program stored thereon; wherein the program is executed by a processor to implement the steps of the wireless communication method applied to the relay node.

A twelfth aspect of the present disclosure provides a computer readable storage medium, including: a program stored thereon; wherein the program is executed by a processor to implement the steps of the wireless communication method applied to the donor gNB.

It can be seen from the technical solutions provided in the foregoing embodiments of the present disclosure that the technical solutions of the embodiments of the present disclosure have at least one of the following technical effects.

In the embodiment of the present disclosure, the relay node can control at least one of the transmission power of the backhaul DL signal from the donor gNB or the transmission power of the access UL signal from the terminal device, according to the target reception power value, so that the difference between the signal power of the backhaul DL signal when the backhaul DL signal reaches the relay node and the signal power of the access UL signal from the terminal device when the access UL signal from the terminal device reaches the relay node, is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

In this embodiment, the donor gNB can adjust the transmission power of the backhaul DL signal from the donor gNB in cooperation with the power control mechanism of the relay node, so that the difference between the signal power of the backhaul DL signal when the backhaul DL signal reaches the relay node and the signal power of the access UL signal from the terminal device when the access UL signal from the terminal device reaches the relay node, is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

in this embodiment, the relay node can control at least one of the transmission time of the backhaul DL signal from the donor gNB or the transmission time of the access UL signal from the terminal device, according to the reference time, so that in the same slot or the same time interval, the difference between the moment when the backhaul DL signal from the donor gNB reaches the relay node and the moment when the access UL signal from the terminal device reaches the relay node is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

in this embodiment, the donor gNB can adjust the transmission time of the backhaul DL signal from the donor gNB in cooperation with the transmission time control mechanism of the relay node, so that in the same slot or the same time interval, the difference between the moment when the backhaul DL signal from the donor gNB reaches the relay node and the moment when the access UL signal from the terminal device reaches the relay node is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate some of the embodiments set forth in the present application. Other drawings may be obtained based on the described drawings.

DETAILED DESCRIPTION

Figure 1:
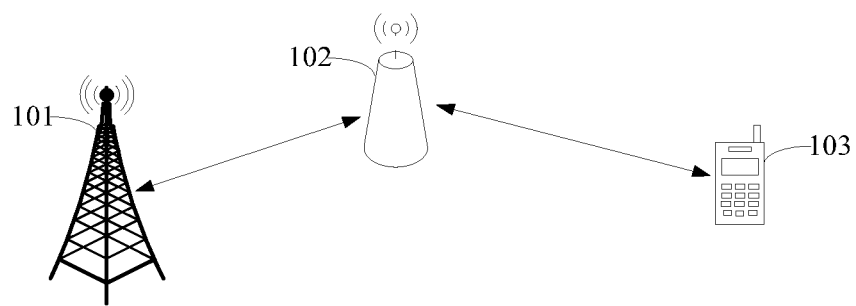
FIG. 1 is a scenario diagram of a single-hop relay system in the related art.

To enable a better understanding of the technical solutions in the present disclosure for those skilled in the art, the technical solutions in embodiments of the present disclosure are described clearly in conjunction with drawings in the embodiments of the present disclosure. Apparently, the described embodiments are merely a part of rather than all the embodiments of the present application. All other embodiments obtained by a person of ordinary skill in the art based on the embodiments of the present disclosure fall within the scope of the present disclosure.

It should be understood that the technical solutions in embodiments of the present disclosure may be applied to various communication systems, such as a global system of mobile communication (GSM), a code division multiple access (CDMA) system, a wideband code division multiple access (WCDMA), a general packet radio service (GPRS) system, a long term evolution (LTE) system, a frequency division duplex (FDD) system, a time division duplex (TDD) system, a universal mobile telecommunication system (UMTS), a worldwide interoperability for microwave access (WIMAX) communication system, a fifth generation (5G) mobile communication system, a new radio (NR) system, and subsequent evolution communication systems, etc.

In the embodiments of the present disclosure, the terminal device may include, but is not limited to, a mobile station (MS), a mobile terminal, a mobile telephone, a user equipment (UE), a handset, a portable equipment, a vehicle. The terminal device may communicate with one or more core networks via a radio access network (RAN). For example, the terminal device may be a mobile telephone (or referred to as "cellular" phone) or a computer with wireless communication function. The terminal device may also be a portable, pocket-sized, handheld, computer built-in or in-vehicle mobile device.

A network device involved in the embodiments of the present disclosure is a device deployed in a radio access network to provide a wireless communication function for the terminal device. The network device may be a base station, and the base station may include various forms, such as a macro base station, a micro base station, a relay station, an access point. In systems using different radio access technologies, names of devices with functions of the base station may be varied, for example, it may be referred to as an evolved nodeB (eNB or eNodeB) in an LTE network, or a node B in a 3rd generation (3G) network, or a network-side device in a subsequent evolved communication system.

For ease of understanding, some concepts involved in the embodiments of the present disclosure are first introduced.

A backhaul link refers to a communication link between a donor gNB and a relay node in a relay system. The backhaul link may specifically include: a backhaul downlink and a backhaul uplink. The relay node receives a backhaul downlink signal, which is also referred to as "backhaul DL signal", transmitted by the donor gNB in the backhaul downlink. The relay node transmits a backhaul uplink signal, which is also referred to as "backhaul UL signal", to the donor gNB in the backhaul uplink.

An access link refers to a communication link between a relay node and a terminal device that accesses a relay cell. The access link may specifically include: an access downlink and an access uplink. The relay node transmits an access downlink signal, which is also referred to as an "access DL signal", to the terminal device in the access downlink. The relay node receives an access uplink signal, which is also referred to as an "access UL signal", transmitted by the terminal device in the access uplink. It should be noted that the terminal device involved in the embodiments of the present disclosure refers to a terminal device that accesses a relay cell.

A donor gNB refers to an upper-level node of the relay node. In practical applications, the donor gNB may be directly wired to a core network, or, may be relayed to the core network through an upper-level donor node.

In a radio relay system, the relay node needs to communicate with the donor gNB and the terminal device. Due to the half-duplex operation mode, the relay node cannot transmit and receive signals at the same time on a same carrier frequency (if transmitting and receiving signals at the same time on the same carrier frequency, it will cause self-interference problems of the relay node). Specifically, when the relay node receives a signal on the backhaul link, the relay node cannot transmit a signal on the access link. On the contrary, when the relay node transmits a signal on the backhaul link, the relay node cannot receive a signal on the access link. Thus, a certain resource allocation mechanism is required to ensure that the relay node can normally receive and transmit signals.

Figure 2:
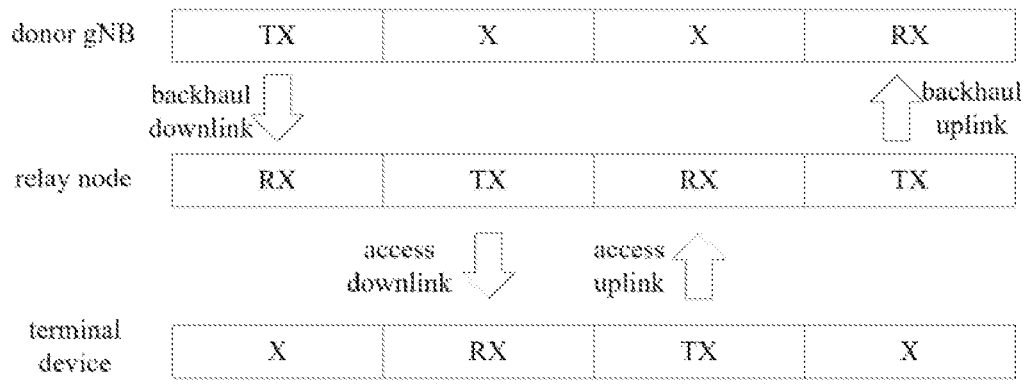
FIG. 2 is a scenario diagram of adopting a TDM scheme for signal transmission in a relay system in the related art.

In order to ensure that the relay node can operate in the half-duplex mode, in a 4G LTE relay system, a TDM multiplexing scheme is adopted. Specifically, as shown in FIG. 2, FIG. 2 shows a signal transmission process between a donor gNB, a relay node and a terminal device in a relay system, where TX indicates that a corresponding network node is in a transmitting state, RX indicates that a corresponding network node is in a receiving state, and X indicates that a corresponding network node is not transmitting or receiving. As can be seen from FIG. 2, the donor gNB transmits a signal to the relay node through a backhaul downlink, which occupies a slot; the relay node transmits a signal to the terminal device through an access downlink, which occupies a slot; the terminal device transmits a signal to the relay node through an access uplink, which occupies a slot; and the relay node transmits a signal to the donor gNB through a backhaul uplink, which occupies a slot. In other words, four slots are required to complete a bidirectional signal transmission between the donor gNB and the terminal device. But the donor gNB and the terminal device are idle (i.e., not transmitting or receiving) for half of the time, it will cause a large transmission delay and low communication efficiency of the relay system.

In order to further improve the transmission efficiency of the relay system, 5G proposes a multiplexing scheme to improve the efficiency of backhaul/access link, which specifically includes: a frequency division multiplexing (FDM) scheme or a spatial domain multiplexing (SDM) scheme.

Figure 3:
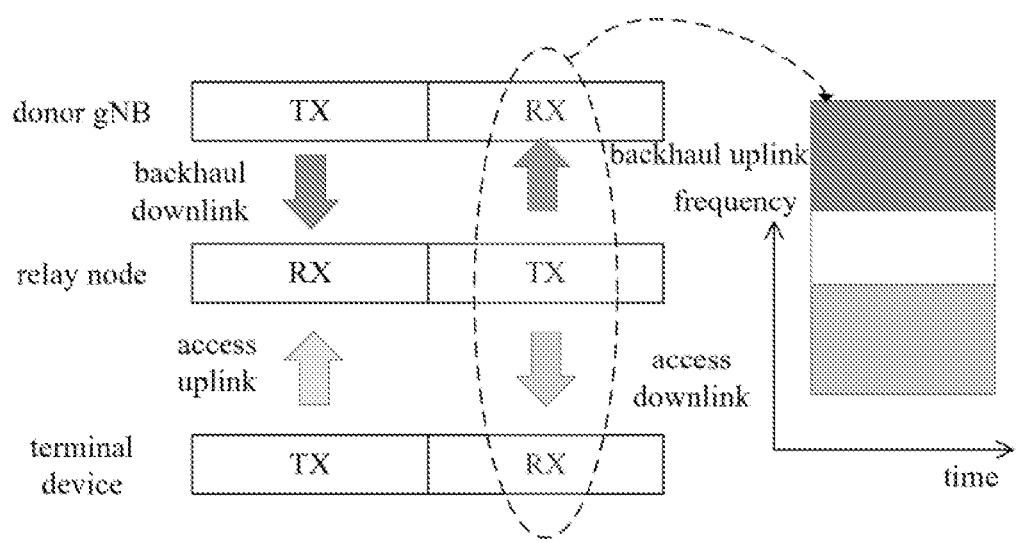
FIG. 3 is a scenario diagram of adopting an FDM or SDM scheme for signal transmission in a relay system according to the present disclosure.

In the FDM scheme, the relay node can simultaneously receive a backhaul DL signal from the donor gNB and receive an access UL signal from the terminal device at the same time, or can simultaneously transmit a backhaul UL signal to the donor gNB and transmit an access DL signal to the terminal device at the same time. As shown in FIG. 3, when the backhaul downlink and the access uplink operate simultaneously, or when the backhaul uplink and the access downlink operate simultaneously, the backhaul link and the access link use different frequency resources, i.e., FDM.

In the SDM scheme, when the backhaul downlink and the access uplink operate simultaneously, or when the backhaul uplink and the access downlink operate simultaneously, the backhaul link and the access link may use same frequency resources, and the two links are further distinguished by spatial resources.

As can be seen from FIG. 2 and FIG. 3, compared with the TDM scheme in the 4G LTE, in the FDM or SDM scheme, only two slots are required to complete a bidirectional signal transmission between the donor gNB and the terminal device. Further, signal reception and transmission operations are performed in each slot among the donor gNB, the relay node and the terminal device, thereby reducing the data transmission delay and improving the communication efficiency of the relay system. However, in the current 5G technical discussion, only the concept of the FDM/SDM scheme is proposed, and there is no specific technical scheme design.

In the embodiments of the present disclosure, considering that a distance between the relay node and the donor gNB is different from a distance between the relay node and the terminal device, radio propagation environments are different, a transmission power of the donor gNB is different from a transmission power of the terminal device, in order to support simultaneous operation of the backhaul link and the access link and to multiplex the backhaul link and the access link in the FDM or SDM mode, the following two technical problems need to be solved.

First technical problem: the relay node needs to simultaneously receive the backhaul DL signal from the donor gNB and the access UL signal from the terminal device, if a signal strength difference between the two signals reaching the relay node is too large to exceed a tolerance of the relay node, it will cause the relay node to be unable to receive any signal normally; therefore, a reasonable power control scheme is needed.

Second technical problem: the relay node needs to simultaneously receive the backhaul DL signal from the donor gNB and the access UL signal from the terminal device, if moments when the two signals reach the relay node are not synchronized and a synchronization deviation exceeds a tolerance of the relay node, the two signals will not be orthogonal when the relay node receives them, which causes mutual interference, resulting in that the relay node is unable to receive any signal normally; therefore, a reasonable timing synchronization mechanism is needed.

Figure 4:
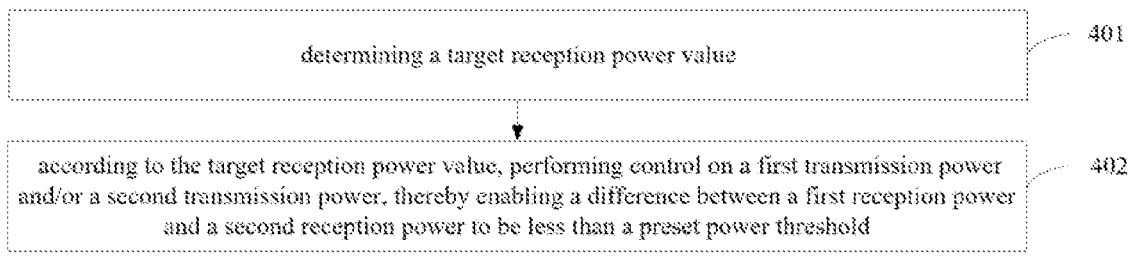
FIG. 4 is a flowchart of a wireless communication method according to an embodiment of the present disclosure.

In order to solve the foregoing first technical problem, one embodiment of the present disclosure provides a wireless communication method. As shown in FIG. 4, FIG. 4 is a flowchart of a wireless communication method according to an embodiment of the present disclosure. The method is operable by a relay node, and the method may include the following steps 401 and 402.

Step 401: determining a target reception power value.

Step 402: according to the target reception power value, performing control on at least one of a first transmission power or a second transmission power, thereby enabling a difference between a first reception power and a second reception power to be less than a preset power threshold.

In the embodiment of the present disclosure, the first transmission power is a transmission power of a backhaul DL signal transmitted by a donor gNB of the relay node to the relay node. The second transmission power is a transmission power of an access UL signal transmitted by a terminal device to the relay node. The first reception power is a reception power when the backhaul DL signal from the donor gNB reaches the relay node. The second reception power is a reception power when the access UL signal from the terminal device reaches the relay node.

In the embodiment of the present disclosure, the preset power threshold is a maximum power difference between two signals that the relay node can tolerate.

In the embodiment of the present disclosure, the relay node may determine the target reception power value by referring to the first reception power; or, the relay node may determine the target reception power value by referring to the second reception power; or, the relay node may determine the target reception power value without referring to the first reception power and the second reception power.

Optionally, in an implementation, the relay node does not refer to the first reception power and the second reception power when determining the target reception power value, that is, the target reception power value is set by the relay node itself. In this case, the relay node adjusts the first transmission power and the second transmission power according to the target reception power value, so that the difference between the first reception power and the second reception power is within tolerance of the relay node. At this point, the foregoing step 402 may specifically include at least one of the following steps 4021 or step 4022 (not shown).

Step 4021: performing control on the first transmission power, thereby enabling a difference between the first reception power and the target reception power value to be less than a first preset power threshold;

Step 4022: performing control on the second transmission power, thereby enabling a difference between the second reception power and the target reception power value to be less than a second preset power threshold.

In the embodiment of the present disclosure, the preset power threshold, the first preset power threshold, and the second power threshold are different. The preset power threshold refers to a tolerance of the relay node to the power difference between the two signals. By setting the first preset power threshold and the second preset power threshold, the relay node performs control on the first transmission power and the second transmission power, thereby enabling the difference between the first reception power and the second reception power to be less than the preset power threshold.

It can be seen that the relay node first sets the target reception power value, and then performs control on the transmission power of the backhaul DL signal from the donor gNB and the transmission power of the access UL signal from the terminal device, so that a difference between a signal strength of the backhaul DL signal when it reaches the relay node and a signal strength of the access UL signal when it reaches the relay node, is within a tolerance range of the relay node.

Optionally, in another implementation, the relay node refers to the first reception power when determining the target reception power value, that is, the target reception power value is set by the relay node according to the first reception power. In this case, the relay node needs to obtain the first reception power, and then determines that the first reception power is the target reception power value, and then only adjusts the second transmission power based on the first reception power, thereby enabling the difference between the first reception power and the second reception power to be within a tolerance range of the relay node. As this point, the foregoing step 402 may specifically include the following steps:

performing control on the second transmission power, thereby enabling a difference between the second reception power and the target reception power value to be less than the preset power threshold.

Optionally, the relay node may perform at least one of measuring a reception power of the backhaul DL signal from the donor gNB when it reaches the relay node, to obtain the first reception power, or, receiving a signaling transmitted by the donor gNB, and determining the first reception power according to the signaling. The signaling carries related information for determining the first reception power. The related information may be a transmission power intensity of the backhaul DL signal transmitted by the donor gNB, so that the relay node can calculate a difference between the transmission power intensity and a path loss to obtain the first reception power. The signaling includes at least one of the following: radio resource control (RRC) signaling, media access control (MAC) signaling, or physical layer signaling.

It can be seen that the relay node first sets a reception power of the backhaul DL signal from the donor gNB when it reaches the relay node, as the target reception power value, and then performs control only on the transmission power of the access UL signal from the terminal device, so that a difference between a signal strength of the backhaul DL signal when it reaches the relay node and a signal strength of the access UL signal when it reaches the relay node, is within a tolerance range of the relay node.

Optionally, in another implementation, the relay node refers to the second reception power when determining the target reception power value, that is, the target reception power value is set by the relay node according to the second reception power. In this case, the relay node determines that the second reception power is the target reception power value, and only adjusts the first transmission power based on the second reception power, thereby enabling the difference between the first reception power and the second reception power to be within a tolerance range of the relay node. As this point, the foregoing step 402 may specifically include the following steps:

performing control on the first transmission power, thereby enabling a difference between the first reception power and the target reception power value to be less than the preset power threshold.

It can be seen that the relay node first sets a reception power of the access UL signal from the terminal device when it reaches the relay node, as the target reception power value, and then performs control only on the transmission power of the backhaul DL signal from the donor gNB, so that a difference between a signal strength of the backhaul DL signal when it reaches the relay node and a signal strength of the access UL signal when it reaches the relay node, is within a tolerance range of the relay node.

In the embodiment of the present disclosure, when performing control on the first transmission power, at least one of the following (a) or (b) may be adopted.

(a) transmitting the target reception power value to the donor gNB; where the target reception power value is used by the donor gNB to determine the first transmission power, and the first transmission power is determined by the target reception power value and a path loss of a backhaul link between the relay node and the donor gNB, and the path loss refers to a power loss of a signal transmitted on the backhaul link.

Correspondingly, after the donor gNB receives the target reception power value, the donor gNB performs power compensation according to measurement of the path loss of the backhaul link. For example, according to a formula P_backhaul=P_target+pathloss_BH, the first transmission power is determined, where P_backhaul represents the first transmission power, P_target represents the target reception power value, and pathloss_BH represents the path loss.

Optionally, the path loss may be measured by the relay node, and a measurement result is reported by the relay node to the donor gNB. At this point, the relay node measures a path loss of the backhaul link between the relay node and the donor gNB, and transmits the path loss to the donor gNB.

Specifically, the relay node transmits an uplink signal to the donor gNB at a certain set power. The donor gNB measures a reception power strength, and feeds back a measured reception power strength to the relay node. The relay node calculates (usually a difference calculation) the path loss, according to the known set power and an actual reception power of the donor gNB.

Optionally, the path loss may be measured by the donor gNB.

Specifically, the relay node transmits an uplink signal to the donor gNB at a certain set power. The donor gNB measures a reception power strength, and calculates the path loss, according to the known set power and an actual reception power of the donor gNB.

(b) transmitting a first power adjustment instruction to the donor gNB; where the first power adjustment instruction is configured to instruct the donor gNB to increase or decrease the first transmission power, thereby enabling a difference between the first reception power and the target reception power value to be less than the preset power threshold.

Optionally, the first power adjustment instruction may be similar to transmission power control (TPC) in the LTE or NR. After receiving the first power adjustment instruction, the donor gNB correspondingly executes an operation of increasing or decreasing the transmission power.

In the embodiment of the present disclosure, when adjusting the second transmission power, the following manner may be adopted:

transmitting a second power adjustment instruction to the terminal device; where the second power adjustment instruction is configured to instruct the terminal device to increase or decrease the second transmission power, thereby enabling a difference between the second reception power and the target reception power value to be less than the preset power threshold.

Optionally, the relay node may adjust the second transmission power of the terminal device by at least one of setting reasonable open loop power control parameters (i.e., P0, alpha, etc.), or transmitting a closed loop power control command TPC to the terminal device.

It can be seen from the foregoing embodiment that, in this embodiment, the relay node can control at least one of the transmission power of the backhaul DL signal from the donor gNB or the transmission power of the access UL signal from the terminal device, according to the target reception power value, so that the difference between the signal power of the backhaul DL signal when the backhaul DL signal reaches the relay node and the signal power of the access UL signal from the terminal device when the access UL signal from the terminal device reaches the relay node, is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

Figure 5:
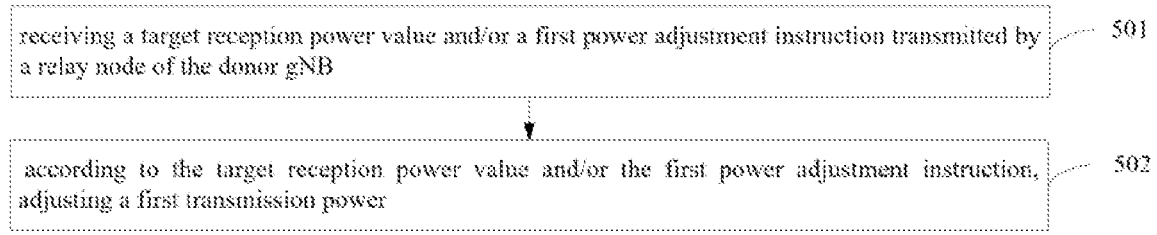
FIG. 5 is a flowchart of a wireless communication method according to another embodiment of the present disclosure.

FIG. 5 is a flowchart of a wireless communication method according to another embodiment of the present disclosure. The method is operable by a donor gNB. As shown in FIG. 5, the method may include the following steps 501 and 502.

Step 501: receiving at least one of a target reception power value or a first power adjustment instruction transmitted by a relay node of the donor gNB.

Step 502: according to at least one of the target reception power value or the first power adjustment instruction, adjusting a first transmission power.

In the embodiment of the present disclosure, the first transmission power is a transmission power of a backhaul DL signal transmitted by the donor gNB to the relay node. The target reception power value is used by the donor gNB to determine the first transmission power. The first transmission power is determined by the target reception power value and a path loss of a backhaul link between the relay node and the donor gNB. The first power adjustment instruction is configured to instruct the donor gNB to increase or decrease the first transmission power, thereby enabling a difference between the first reception power and the target reception power value to be less than a preset power threshold. The first reception power is a reception power when the backhaul DL signal from the donor gNB reaches the relay node.

In the embodiment of the present disclosure, the path loss may be measured by the relay node and may be transmitted by the relay node to the donor gNB; or, the path loss may be measured by the donor gNB. Specific measurement method is similar to the content in the embodiment shown in FIG. 4, and will not be repeated here.

It can be seen from the foregoing embodiment that, in this embodiment, the donor gNB can adjust the transmission power of the backhaul DL signal from the donor gNB in cooperation with the power control mechanism of the relay node, so that the difference between the signal power of the backhaul DL signal when the backhaul DL signal reaches the relay node and the signal power of the access UL signal from the terminal device when the access UL signal from the terminal device reaches the relay node, is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

Figure 6:
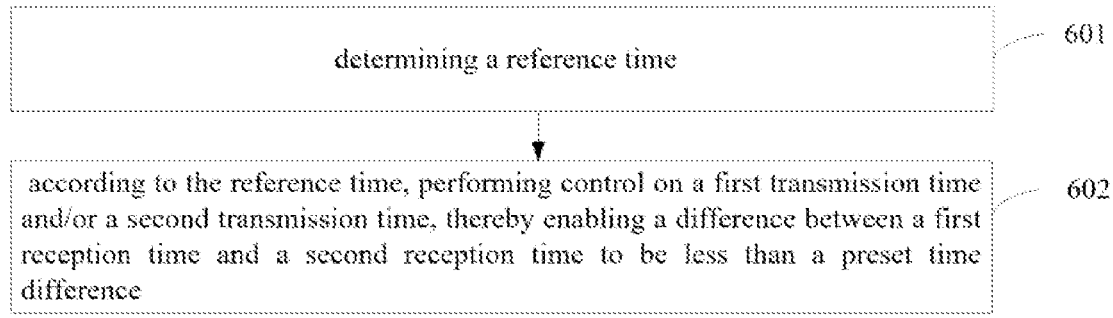
FIG. 6 is a flowchart of a wireless communication method according to another embodiment of the present disclosure.

In order to solve the foregoing second technical problem, one embodiment of the present disclosure provides a wireless communication method. As shown in FIG. 6, FIG. 4 is a flowchart of a wireless communication method according to another embodiment of the present disclosure. The method is operable by a relay node, and the method may include the following steps 601 and 602.

Step 601: determining a reference time.

The reference time may be an absolute time or a relative time.

Step 602: according to the reference time, performing control on at least one of a first transmission time or a second transmission time, thereby enabling a difference between a first reception time and a second reception time to be less than a preset time difference.

In the embodiment of the present disclosure, the first transmission time is a transmission time of a backhaul DL signal transmitted by a donor gNB of the relay node to the relay node. The second transmission time is a transmission time of an access UL signal transmitted by a terminal device to the relay node. The first reception time is a moment when the backhaul DL signal from the donor gNB reaches the relay node. The second reception time is a moment when the access UL signal from the terminal device reaches the relay node.

In the embodiment of the present disclosure, the preset time difference is a maximum value of an interval between arrival times of the two signals that the relay node can tolerate.

In the embodiment of the present disclosure, the relay node may determine the reference time by referring to the first reception time; or, the relay node may determine the reference time by referring to the second reception time; or, the relay node may determine the reference time without referring to the first reception time and the second reception time.

Optionally, in an implementation, the relay node does not refer to the first reception time and the second reception time when determining the reference time, that is, the reference time is set by the relay node itself. In this case, the foregoing step 601 may specifically include the following step: determining frame timing of the relay node as the reference time. At this point, the relay node adjusts the first transmission time and the second transmission time according to the reference time, so that the difference between the first reception time and the second reception time is within a tolerance range of the relay node. At this point, the foregoing step 602 may specifically include at least one of the following steps 6021 or step 6022 (not shown).

Step 6021: performing control on the first transmission time, thereby enabling a difference between the first reception time and the reference time to be less than a first preset time difference;

Step 6022: performing control on the second transmission time, thereby enabling a difference between the second reception time and the reference time to be less than a second preset time difference.

In the embodiment of the present disclosure, the preset time difference, the first preset time difference, and the preset second time difference are different. The preset time difference refers to a tolerance of the relay node to difference in arrival time of the two signals. By setting the first preset time difference and the second preset time difference, the relay node performs control on the first transmission time and the second transmission time, thereby enabling the difference between the first reception time and the second reception time to be less than the preset time difference.

It can be seen that the relay node first sets the reference time, and then performs control on the transmission time of the backhaul DL signal from the donor gNB and the transmission time of the access UL signal from the terminal device, so that a difference between a moment when the backhaul DL signal from the donor gNB reaches the relay node and a moment when the access UL signal from the terminal device reaches the relay node is within a tolerance range of the relay node.

Optionally, in an implementation, the relay node refers to the first reception time when determining the reference time, that is, the reference time is set by the relay node according to the first reception time. In this case, the relay node needs to obtain the first reception time, then determines that the first reception time is the reference time, and then adjusts only the second transmission time according to the first reception time, so that the difference between the first reception time and the second reception time is within the tolerance of the relay node. At this point, the foregoing step 602 may specifically include the following step:

performing control on the second transmission time, thereby enabling a difference between the second reception time and the reference time to be less than the preset time difference.

Optionally, the relay node may measure a moment when the backhaul DL signal from the donor gNB reaches the relay node, to obtain the first reception time.

It can be seen that the relay node first sets the moment when the backhaul DL signal from the donor gNB reaches the relay node as the reference time, and then performs control only on the transmission time of the access UL signal from the terminal device, so that the difference between the moment when the backhaul DL signal reaches the relay node and the moment when the access UL signal reaches the relay node is within the tolerance range of the relay node.

Optionally, in another implementation, the relay node refers to the second reception time when determining the reference time, that is, the reference time is set by the relay node according to the second reception time. In this case, the relay node determines that the second reception time is the reference time, and only adjusts the first transmission time according to the second reception time, so that the difference between the first reception time and the second reception time is within the tolerance of the relay node. At this point, the foregoing step 602 may specifically include the following step:

performing control on the first transmission time, thereby enabling a difference between the first reception time and the reference time to be less than the preset time difference.

It can be seen that the relay node first sets the moment when the access UL signal from the terminal device reaches the relay node as the reference time, and then performs control only on the transmission time of the backhaul DL signal from the donor gNB, so that the difference between the moment when the backhaul DL signal reaches the relay node and the moment when the access UL signal reaches the relay node is within the tolerance range of the relay node.

In the embodiment of the present disclosure, when performing control on the first transmission time, the following manner may be adopted:

determining a moment when the backhaul DL signal from the donor gNB reaches the relay node; comparing the moment when the backhaul DL signal from the donor gNB reaches the relay node with the reference time, to obtain a comparison result; generating a first time adjustment instruction according to the comparison result; transmitting the first time adjustment instruction to the donor gNB, thereby informing the donor gNB to transmit the backhaul DL signal in advance or delay in a certain time unit (for example, 16 Ts); where the first time adjustment instruction is configured to instruct the donor gNB to advance or delay the first transmission time, thereby enabling the difference between the first reception time and the reference time to be less than the preset time difference.

In the embodiment of the present disclosure, when performing control on the second transmission time, the following manner may be adopted:

transmitting a second time adjustment instruction to the terminal device, where the second time adjustment instruction is configured to instruct the terminal device to advance or delay the second transmission time, thereby enabling the difference between the second reception time and the reference time to be less than the preset time difference.

Optionally, the relay node may adjust uplink transmission time of the terminal device by transmitting the second time adjustment instruction to the terminal device in a random access procedure.

Optionally, the relay node may adjust the uplink transmission time of the terminal device by transmitting a closed-loop timing adjustment command (TAC).

It can be seen from the foregoing embodiment that, in this embodiment, the relay node can control at least one of the transmission time of the backhaul DL signal from the donor gNB or the transmission time of the access UL signal from the terminal device, according to the reference time, so that in the same slot or the same time interval, the difference between the moment when the backhaul DL signal from the donor gNB reaches the relay node and the moment when the access UL signal from the terminal device reaches the relay node is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

Figure 7:
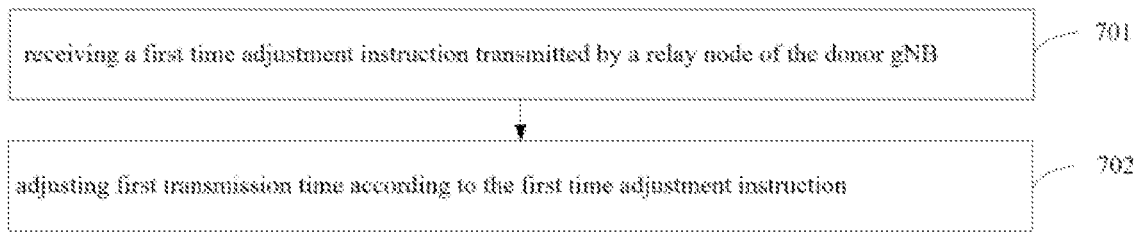
FIG. 7 is a flowchart of a wireless communication method according to another embodiment of the present disclosure.

FIG. 7 is a flowchart of a wireless communication method according to another embodiment of the present disclosure. The method is operable by a donor gNB. As shown in FIG. 7, the method may include the following steps 701 and 702.

Step 701: receiving a first time adjustment instruction transmitted by a relay node of the donor gNB.

Step 702: adjusting first transmission time according to the first time adjustment instruction.

In the embodiment of the present disclosure, the first transmission time is a transmission time of a backhaul DL signal transmitted by the donor gNB to the relay node. The first time adjustment instruction is configured to instruct the donor gNB to advance or delay the first transmission time, thereby enabling the difference between the first reception time and the reference time determined by the relay node to be less than the preset time difference. The first reception time is a moment when the backhaul DL signal from the donor gNB reaches the relay node. Specific adjustment process is similar to the content in the embodiment shown in FIG. 6, and will not be repeated here.

It can be seen from the foregoing embodiment that, in this embodiment, the donor gNB can adjust the transmission time of the backhaul DL signal from the donor gNB in cooperation with the transmission time control mechanism of the relay node, so that in the same slot or the same time interval, the difference between the moment when the backhaul DL signal from the donor gNB reaches the relay node and the moment when the access UL signal from the terminal device reaches the relay node is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

Figure 8:
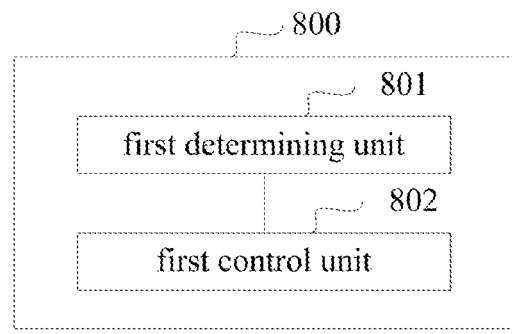
FIG. 8 is a schematic structural diagram of a wireless communication device according to an embodiment of the present disclosure.

FIG. 8 is a schematic structural diagram of a wireless communication device according to an embodiment of the present disclosure. As shown in FIG. 8, the wireless communication device 800 is applied to a relay node. The wireless communication device 800 may include: a first determining unit 801 and a first control unit 802.

The first determining unit 801 is configured to determine a target reception power value.

The first control unit 802 is configured to, according to the target reception power value, perform control on at least one of a first transmission power or a second transmission power, thereby enabling a difference between a first reception power and a second reception power to be less than a preset power threshold.

The first transmission power is a transmission power of a backhaul DL signal transmitted by a donor gNB of the relay node to the relay node.

The second transmission power is a transmission power of an access UL signal transmitted by a terminal device to the relay node.

The first reception power is a reception power when the backhaul DL signal from the donor gNB reaches the relay node.

The second reception power is a reception power when the access UL signal from the terminal device reaches the relay node.

It can be seen from the foregoing embodiment that, in this embodiment, the relay node can control at least one of the transmission power of the backhaul DL signal from the donor gNB or the transmission power of the access UL signal from the terminal device, according to the target reception power value, so that the difference between the signal power of the backhaul DL signal when the backhaul DL signal reaches the relay node and the signal power of the access UL signal from the terminal device when the access UL signal from the terminal device reaches the relay node, is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

Optionally, as an embodiment, the first control unit 802 includes at least one of the following:

a first power control sub-unit configured to, perform control on the first transmission power, thereby enabling a difference between the first reception power and the target reception power value to be less than a first preset power threshold; or, a second power control sub-unit configured to perform control on the second transmission power, thereby enabling a difference between the second reception power and the target reception power value to be less than a second preset power threshold.

Optionally, as an embodiment, the first determining unit 801 includes:

a first power value determining sub-unit configured to determine that the first reception power is the target reception power value.

The first control unit 802 includes:

a third power control sub-unit configured to perform control on the second transmission power, thereby enabling a difference between the second reception power and the target reception power value to be less than the preset power threshold.

Optionally, as an embodiment, the first determining unit 801 includes:

a second power value determining sub-unit configured to determine that the second reception power is the target reception power value.

The first control unit 802 includes:

a fourth power control sub-unit configured to perform control on the first transmission power, thereby enabling a difference between the first reception power and the target reception power value to be less than the preset power threshold.

Optionally, as an embodiment, the first control unit 802 includes:

a first transmission sub-unit, configured to transmit the target reception power value to the donor gNB;

where the target reception power value is used by the donor gNB to determine the first transmission power, and the first transmission power is determined by the target reception power value and a path loss of a backhaul link between the relay node and the donor gNB.

Optionally, as an embodiment, the wireless communication device 800 further includes:

a first measurement unit configured to measure a path loss of the backhaul link between the relay node and the donor gNB;

a first transmission unit configured to transmit the path loss to the donor gNB.

Optionally, as an embodiment, the path loss is measured by the donor gNB.

Optionally, as an embodiment, the first control unit 802 includes:

a second transmission sub-unit configured to transmit a first power adjustment instruction to the donor gNB;

where the first power adjustment instruction is configured to instruct the donor gNB to increase or decrease the first transmission power, thereby enabling a difference between the first reception power and the target reception power value to be less than the preset power threshold.

Optionally, as an embodiment, the first control unit 802 includes:

a third transmission sub-unit configured to transmit a second power adjustment instruction to the terminal device;

where the second power adjustment instruction is configured to instruct the terminal device to increase or decrease the second transmission power, thereby enabling a difference between the second reception power and the target reception power value to be less than the preset power threshold.

Optionally, as an embodiment, the wireless communication device 800 further includes at least one of:

a second measurement unit configured to measure a reception power of the backhaul DL signal from the donor gNB when it reaches the relay node, to obtain the first reception power; or a first receiving unit configured to receive a signaling transmitted by the donor gNB, and determine the first reception power according to the signaling;

where the signaling carries related information for determining the first reception power.

Optionally, as an embodiment, the signaling includes at least one of the following: radio resource control (RRC) signaling, media access control (MAC) signaling, or physical layer signaling.

Figure 9:
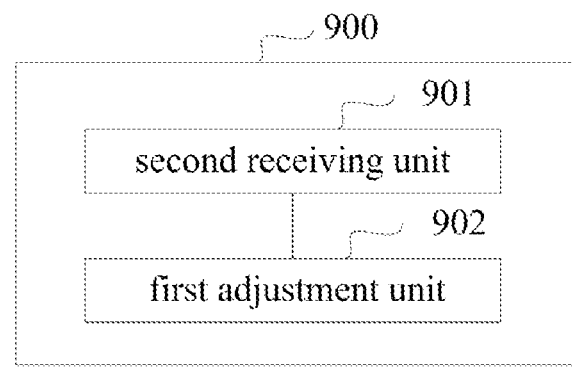
FIG. 9 is a schematic structural diagram of a wireless communication device according to another embodiment of the present disclosure.

FIG. 9 is a schematic structural diagram of a wireless communication device according to another embodiment of the present disclosure. As shown in FIG. 9, the wireless communication device 900 is applied to a donor gNB. The wireless communication device 900 may include: a second receiving unit 901 and a first adjustment unit 902.

The second receiving unit 901 is configured to receive at least one of a target reception power value or a first power adjustment instruction transmitted by a relay node of the donor gNB.

The first adjustment unit 902 is configured to adjust a first transmission power according to at least one of the target reception power value or the first power adjustment instruction.

The first transmission power is a transmission power of a backhaul DL signal transmitted by the donor gNB to the relay node.

The target reception power value is used by the donor gNB to determine the first transmission power. The first transmission power is determined by the target reception power value and a path loss of a backhaul link between the relay node and the donor gNB.

The first power adjustment instruction is configured to instruct the donor gNB to increase or decrease the first transmission power, thereby enabling a difference between the first reception power and the target reception power value to be less than a preset power threshold.

The first reception power is a reception power when the backhaul DL signal from the donor gNB reaches the relay node.

It can be seen from the foregoing embodiment that, in this embodiment, the donor gNB can adjust the transmission power of the backhaul DL signal from the donor gNB in cooperation with the power control mechanism of the relay node, so that the difference between the signal power of the backhaul DL signal when the backhaul DL signal reaches the relay node and the signal power of the access UL signal from the terminal device when the access UL signal from the terminal device reaches the relay node, is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

Figure 10:
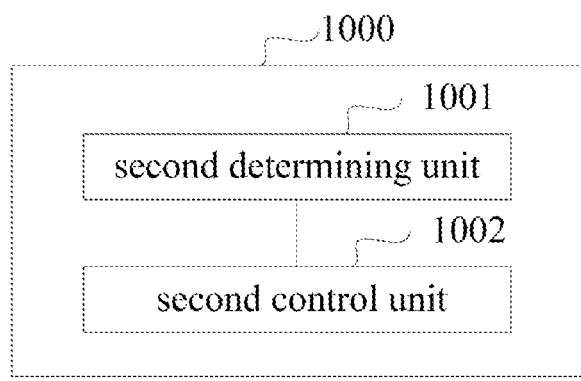
FIG. 10 is a schematic structural diagram of a wireless communication device according to an embodiment of the present disclosure.

FIG. 10 is a schematic structural diagram of a wireless communication device according to another embodiment of the present disclosure. As shown in FIG. 10, the wireless communication device 1000 is applied to a relay node. The wireless communication device 1000 may include: a second determining unit 1001 and a second control unit 1002.

The second determining unit 1001 is configured to determine a reference time.

The second control unit 1002 is configured to, according to the reference time, perform control on at least one of a first transmission time or a second transmission time, thereby enabling a difference between a first reception time and a second reception time to be less than a preset time difference.

The first transmission time is a transmission time of a backhaul DL signal transmitted by a donor gNB of the relay node to the relay node.

The second transmission time is a transmission time of an access UL signal transmitted by a terminal device to the relay node.

The first reception time is a moment when the backhaul DL signal from the donor gNB reaches the relay node.

The second reception time is a moment when the access UL signal from the terminal device reaches the relay node.

It can be seen from the foregoing embodiment that, in this embodiment, the relay node can control at least one of the transmission time of the backhaul DL signal from the donor gNB or the transmission time of the access UL signal from the terminal device, according to the reference time, so that in the same slot or the same time interval, the difference between the moment when the backhaul DL signal from the donor gNB reaches the relay node and the moment when the access UL signal from the terminal device reaches the relay node is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

Optionally, as an embodiment, the second determining unit 1001 includes:

a first time determining sub-unit configured to determine a frame timing of the relay node as the reference time.

Optionally, as an embodiment, the second control unit 1002 includes at least one of the following:

a first time control sub-unit configured to perform control on the first transmission time, thereby enabling a difference between the first reception time and the reference time to be less than a first preset time difference; or, a second time control sub-unit configured to perform control on the second transmission time, thereby enabling a difference between the second reception time and the reference time to be less than a second preset time difference.

Optionally, as an embodiment, the second determining unit 1001 includes:

a second time determining sub-unit configured to determine that the first reception time is the reference time.

The second control unit 1002 includes:

a third time control sub-unit configured to perform control on the second transmission time, thereby enabling a difference between the second reception time and the reference time to be less than the preset time difference.

Optionally, as an embodiment, the second determining unit 1001 includes:

a third time determining sub-unit configured to determine that the second reception time is the reference time.

The second control unit 1002 includes:

a fourth time control sub-unit configured to perform control on the first transmission time, thereby enabling a difference between the first reception time and the reference time to be less than the preset time difference.

Optionally, as an embodiment, the second control unit 1002 includes:

a fourth time determining sub-unit configured to determine a moment when the backhaul DL signal from the donor gNB reaches the relay node;

a time comparison sub-unit configured to compare the moment when the backhaul DL signal from the donor gNB reaches the relay node with the reference time, to obtain a comparison result;

an instruction generation sub-unit configured to generate a first time adjustment instruction according to the comparison result;

a fourth transmission sub-unit configured to transmit the first time adjustment instruction to the donor gNB;

where the first time adjustment instruction is configured to instruct the donor gNB to advance or delay the first transmission time, thereby enabling the difference between the first reception time and the reference time to be less than the preset time difference.

Optionally, as an embodiment, the second control unit 1002 includes:

a fifth transmission sub-unit configured to transmit a second time adjustment instruction to the terminal device;

where the second time adjustment instruction is configured to instruct the terminal device to advance or delay the second transmission time, thereby enabling the difference between the second reception time and the reference time to be less than the preset time difference.

Optionally, as an embodiment, the wireless communication device 1000 further includes:

a third measurement unit configured to measure a moment when the backhaul DL signal from the donor gNB reaches the relay node, to obtain the first reception time.

Figure 11:
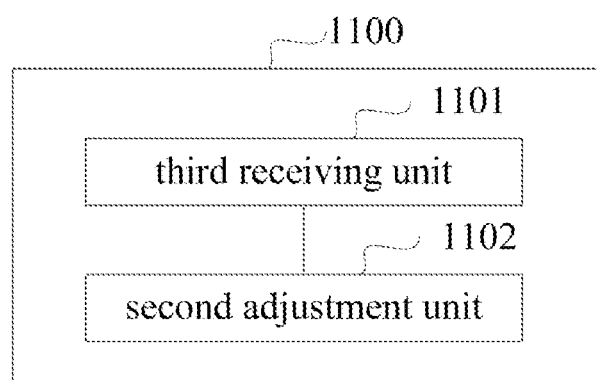
FIG. 11 is a schematic structural diagram of a wireless communication device according to another embodiment of the present disclosure.

FIG. 11 is a schematic structural diagram of a wireless communication device according to another embodiment of the present disclosure. As shown in FIG. 11, a wireless communication device 1100 is applied to a donor gNB. The wireless communication device 1100 may include: a third receiving unit 1101 and a second adjustment unit 1102.

The third receiving unit 1101 is configured to receive a first time adjustment instruction transmitted by a relay node of the donor gNB.

The second adjustment unit 1102 is configured to adjust first transmission time according to the first time adjustment instruction.

The first transmission time is a transmission time of a backhaul DL signal transmitted by the donor gNB to the relay node.

The first time adjustment instruction is configured to instruct the donor gNB to advance or delay the first transmission time, thereby enabling the difference between the first reception time and the reference time determined by the relay node to be less than the preset time difference.

The first reception time is a moment when the backhaul DL signal from the donor gNB reaches the relay node.

It can be seen from the foregoing embodiment that, in this embodiment, the donor gNB can adjust the transmission time of the backhaul DL signal from the donor gNB in cooperation with the transmission time control mechanism of the relay node, so that in the same slot or the same time interval, the difference between the moment when the backhaul DL signal from the donor gNB reaches the relay node and the moment when the access UL signal from the terminal device reaches the relay node is within the tolerance range of the relay node, thereby ensuring simultaneous operation of the backhaul link and the access link in the relay system, enabling the backhaul link and the access link to be effectively multiplexed in the FDM or SDM mode. In this way, when maintaining the half-duplex operation mode of the relay node, the communication delay can be reduced and the communication efficiency of the system can be improved. In addition, there is no higher requirement on the capability of the relay node, and the relay node still performs signal reception and transmission operations in half-duplex mode, thus the equipment cost is not increased.

Figure 12:
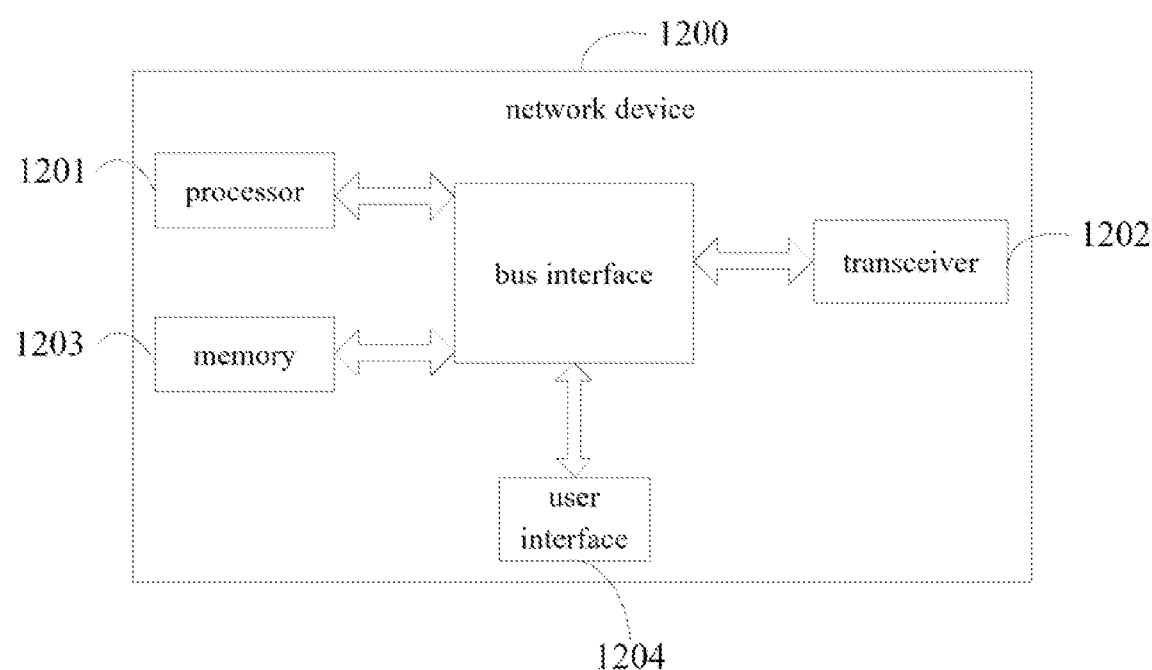
FIG. 12 is a schematic structural diagram of a network device according to an embodiment of the present disclosure.

FIG. 12 is a schematic structural diagram of a network device according to an embodiment of the present disclosure. The network device shown in FIG. 12 can implement details of the wireless communication method in the method embodiment of any of FIGS. 4-7, and achieve the same effect. As shown in FIG. 12, the network device 1200 includes a processor 1201, a transceiver 1202, a memory 1203, a user interface 1204, and a bus interface.

In the embodiment of the present disclosure, the network device 1200 further includes: a program stored on the memory 1203 and executable on the processor 1201. When the network device 1200 is a relay node, the program is executed by the processor 1201 to perform the following steps:

determining a target reception power value; according to the target reception power value, performing control on at least one of a first transmission power or a second transmission power, thereby enabling a difference between a first reception power and a second reception power to be less than a preset power threshold; where the first transmission power is a transmission power of a backhaul DL signal transmitted by a donor gNB of the relay node to the relay node, the second transmission power is a transmission power of an access UL signal transmitted by a terminal device to the relay node, the first reception power is a reception power when the backhaul DL signal from the donor gNB reaches the relay node, and the second reception power is a reception power when the access UL signal from the terminal device reaches the relay node; or, determining a reference time; according to the reference time, performing control on at least one of a first transmission time or a second transmission time, thereby enabling a difference between a first reception time and a second reception time to be less than a preset time difference; where the first transmission time is a transmission time of a backhaul DL signal transmitted by a donor gNB of the relay node to the relay node, the second transmission time is a transmission time of an access UL signal transmitted by a terminal device to the relay node, the first reception time is a moment when the backhaul DL signal from the donor gNB reaches the relay node, and the second reception time is a moment when the access UL signal from the terminal device reaches the relay node.

When the network device 1200 is the donor gNB, the program is executed by the processor 1201 to implement the following steps:

receiving at least one of a target reception power value or a first power adjustment instruction transmitted by a relay node of the donor gNB; according to at least one of the target reception power value or the first power adjustment instruction, adjusting a first transmission power; where the first transmission power is a transmission power of a backhaul DL signal transmitted by the donor gNB to the relay node, the target reception power value is used by the donor gNB to determine the first transmission power, the first transmission power is determined by the target reception power value and a path loss of a backhaul link between the relay node and the donor gNB, the first power adjustment instruction is configured to instruct the donor gNB to increase or decrease the first transmission power, thereby enabling a difference between the first reception power and the target reception power value to be less than a preset power threshold, and the first reception power is a reception power when the backhaul DL signal from the donor gNB reaches the relay node; or, receiving a first time adjustment instruction transmitted by a relay node of the donor gNB; adjusting first transmission time according to the first time adjustment instruction; where the first transmission time is a transmission time of a backhaul DL signal transmitted by the donor gNB to the relay node, the first time adjustment instruction is configured to instruct the donor gNB to advance or delay the first transmission time, thereby enabling the difference between the first reception time and the reference time determined by the relay node to be less than the preset time difference, and the first reception time is a moment when the backhaul DL signal from the donor gNB reaches the relay node.

In FIG. 12, a bus architecture may include any number of interconnected buses and bridges. Specifically, various circuits of one or more processors, which are represented by the processor 1201, and the storage, which is represented by the memory 1203, are linked together. The bus architecture may link various other circuits, such as a peripheral device, voltage regulator and a power management circuit together. These features are well known in this field, therefore, this disclosure does not make further description on these features. The bus interface provides an interface. The transceiver 1202 may be multiple elements, including a transmitter and a receiver and provide units, which communicate with other devices on the transmission medium. For different terminal devices, the user interface 1204 may also be an interface that can externally and internally connect a required device, which may be, but not limited to, a keypad, a monitor, a speaker, a microphone, a joystick, etc.

The processor 1201 is responsible for managing the bus architecture and common processing, and the memory 1203 may store data used by the processor 1201 when executing the operations.

One embodiment of the present disclosure further provides a computer-readable storage medium which stores a computer program thereon. The computer program is executed by a processor to implement various processes of the wireless communication method embodiment, and can achieve the same technical effect, which will not be repeated here to avoid repetition. The computer readable storage medium, may be, for example, a read-only memory (ROM), a random access memory (RAM), a magnetic disk, or an optical disk.

One embodiment of the present disclosure further provides a computer program product including instructions. When a computer runs the instructions of the computer program product, the computer executes the foregoing wireless communication method. Specifically, the computer program product may be run on the foregoing network device.

The person of ordinary skill in the art may be aware that the units and algorithmic steps of each embodiment described in the embodiments of the present disclosure can be realized by electronic hardware or a combination of the electronic hardware and computer software. Whether these functions are performed with hardware or software depends on the specific application and design constraints of the technical solution. Professionals may use different methods for each particular application to implement the described function, but such implementations should not be considered as beyond the scope of this disclosure.

The technical personnel in the field can clearly understand that, for the convenience and simplicity of description, the specific working process of the system, device and unit described above can refer to the corresponding process in the above method embodiment, and it will not be repeated here.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit.

When the functions are implemented in the form of a software function unit and sold or used as a separate product, the software function unit may be stored in a computer readable storage medium. On the basis of such an understanding, the technical scheme of the preset disclosure in essence or those contributing to the existing technology in embodiments of the present disclosure can be embodied in the form of software products. The computer software product may be stored in a storage medium, which may include several instructions to enable a computer device (which can be a personal computer, server, or network device, etc.) to perform all or partial of the method in each embodiment of the present disclosure. The storage medium may be various kinds of medium that may store the program codes, such as the U disk, a mobile hard disk, Read-Only Memory (ROM), Random Access Memory (RAM), a diskette or a CD-ROM, etc.

The above are only specific implementations of the present disclosure, but the protection scope of the present disclosure is not limited to this. Any technical personnel who is familiar with the technical field can easily think of changes or substitutions within the technical scope of the present disclosure and these changes and substitutions should be included in the protection scope of the present disclosure. Therefore, the protection scope of this application shall be subject to the protection scope of the claims.

What is claimed is:

1. A wireless communication method, comprising:
   determining, by a relay node, a target reception power value; and
   performing, by the relay node, control on at least one of a first transmission power or a second transmission power according to the target reception power value, thereby enabling a difference between a first reception power and a second reception power to be less than a preset power threshold;
   wherein
   the first transmission power is a transmission power of a backhaul downlink (DL) signal transmitted by a donor gNB of the relay node to the relay node;
   the second transmission power is a transmission power of an access uplink (UL) signal transmitted by a terminal device to the relay node;
   the first reception power is a reception power when the backhaul DL signal from the donor gNB reaches the relay node; and
   the second reception power is a reception power when the access UL signal from the terminal device reaches the relay node;
   wherein the performing, by the relay node, control on the first transmission power according to the target reception power value, thereby enabling the difference between the first reception power and the second reception power to be less than a preset power threshold, comprises the steps of:
     performing, by the relay node, control on the first transmission power, thereby enabling the difference between the first reception power and the target reception power value to be less than a first preset power threshold; and
     transmitting, by the relay node, a first power adjustment instruction to the donor gNB;
   wherein the first power adjustment instruction is configured to instruct the donor gNB to increase or decrease the first transmission power, thereby enabling the difference between the first reception power and the target reception power value to be less than the preset power threshold.

2. The method according to claim 1, wherein the performing, by the relay node, control on the second transmission power according to the target reception power value, thereby enabling the difference between the first reception power and the second reception power to be less than a preset power threshold, comprises the steps of:
  performing, by the relay node, control on the second transmission power, thereby enabling the difference between the second reception power and the target reception power value to be less than a second preset power threshold.

3. The method according to claim 1, wherein the determining, by the relay node, a target reception power value, comprises:
  determining, by the relay node, that the first reception power is the target reception power value;
  wherein the performing, by the relay node, control on at least one of the first transmission power or the second transmission power according to the target reception power value, thereby enabling the difference between a first reception power and a second reception power to be less than the preset power threshold, comprises:
    performing, by the relay node, control on the second transmission power, thereby enabling the difference between the second reception power and the target reception power value to be less than the preset power threshold; or,
  wherein the determining the target reception power value, comprises:
    determining that the second reception power is the target reception power value;
  wherein the performing, by the relay node, control on at least one of the first transmission power or the second transmission power according to the target reception power value, thereby enabling the difference between a first reception power and a second reception power to be less than the preset power threshold, comprises:
    performing, by the relay node, control on the first transmission power, thereby enabling the difference between the first reception power and the target reception power value to be less than the preset power threshold.

4. The method according to claim 2, wherein the performing, by the relay node, control on the first transmission power, comprises:
  transmitting, by the relay node, the target reception power value to the donor gNB; wherein the target reception power value is used by the donor gNB to determine the first transmission power, and the first transmission power is determined by the target reception power value and a path loss of a backhaul link between the relay node and the donor gNB; the backhaul DL signal is transmitted on the backhaul link.

5. The method according to claim 2, wherein the performing, by the relay node, control on the second transmission power, comprises:
  transmitting, by the relay node, a second power adjustment instruction to the terminal device;
  wherein the second power adjustment instruction is configured to instruct the terminal device to increase or decrease the second transmission power, thereby enabling the difference between the second reception power and the target reception power value to be less than the preset power threshold.

6. The method according to claim 3, wherein before the step of determining, by the relay node, that the first reception power is the target reception power value, the method further comprises at least one of: measuring, by the relay node, a reception power when the backhaul DL signal from the donor gNB reaches the relay node, to obtain the first reception power; or, receiving, by the relay node, a signaling transmitted by the donor gNB, and determining the first reception power according to the signaling; wherein the signaling carries related information for determining the first reception power.

7. A relay node, comprising:
  a memory, a processor, and a program stored on the memory and executable on the processor;
  wherein the program is executed by the processor to implement steps of:
    determining a target reception power value; and
    performing control on at least one of a first transmission power or a second transmission power according to the target reception power value, thereby enabling a difference between a first reception power and a second reception power to be less than a preset power threshold;
  wherein
    the first transmission power is a transmission power of a backhaul downlink (DL) signal transmitted by a donor gNB of the relay node to the relay node;
    the second transmission power is a transmission power of an access uplink (UL) signal transmitted by a terminal device to the relay node;
    the first reception power is a reception power when the backhaul DL signal from the donor gNB reaches the relay node; and
    the second reception power is a reception power when the access UL signal from the terminal device reaches the relay node;
  wherein when the processor performs control on at least one of the first transmission power or the second transmission power according to the target reception power value, thereby enabling the difference between the first reception power and the second reception power to be less than the preset power threshold, the processor is configured to perform the steps of:
    performing control on the first transmission power, thereby enabling a difference between the first reception power and the target reception power value to be less than a first preset power threshold; and
    transmitting a first power adjustment instruction to the donor gNB; wherein the first power adjustment instruction is configured to instruct the donor gNB to increase or decrease the first transmission power, thereby enabling the difference between the first reception power and the target reception power value to be less than the preset power threshold.

8. The relay node according to claim 7, wherein when the processor performs control on the second transmission power according to the target reception power value, thereby enabling the difference between the first reception power and the second reception power to be less than the preset power threshold, the processor is configured to perform the steps of:
  performing control on the second transmission power, thereby enabling a difference between the second reception power and the target reception power value to be less than a second preset power threshold.

9. The relay node according to claim 7, wherein when the processor determines the target reception power value, the processor is configured to determine that the first reception power is the target reception power value; wherein when the processor performs control on at least one of the first transmission power or the second transmission power according to the target reception power value, thereby enabling the difference between the first reception power and the second reception power to be less than the preset power threshold, the processor is configured to perform control on the second transmission power, thereby enabling a difference between the second reception power and the target reception power value to be less than the preset power threshold.

10. The relay node according to claim 7, wherein when the processor determines the target reception power value, the processor is configured to determine that the second reception power is the target reception power value; when the processor performs control on at least one of the first transmission power or the second transmission power according to the target reception power value, thereby enabling the difference between the first reception power and the second reception power to be less than the preset power threshold, the processor is configured to perform control on the first transmission power, thereby enabling a difference between the first reception power and the target reception power value to be less than the preset power threshold.

11. The relay node according to claim 8, wherein when the processor performs control on the first transmission power, the processor is configured to: transmit the target reception power value to the donor gNB; wherein the target reception power value is used by the donor gNB to determine the first transmission power, and the first transmission power is determined by the target reception power value and a path loss of a backhaul link between the relay node and the donor gNB; the backhaul DL signal is transmitted on the backhaul link.

12. The relay node according to claim 8, wherein when the processor performs control on the second transmission power, the processor is configured to:
transmit a second power adjustment instruction to the terminal device;
wherein the second power adjustment instruction is configured to instruct the terminal device to increase or decrease the second transmission power, thereby enabling the difference between the second reception power and the target reception power value to be less than the preset power threshold.

13. The relay node according to claim 9, wherein before the processor determines that the first reception power is the target reception power value, the processor is further configured to perform at least one of: measuring a reception power when the backhaul DL signal from the donor gNB reaches the relay node, to obtain the first reception power; or, receiving a signaling transmitted by the donor gNB, and determining the first reception power according to the signaling; wherein the signaling carries related information for determining the first reception power.

14. A non-transitory computer readable storage medium, comprising:
a program stored thereon; wherein the program is executed by a processor to implement steps of:
determining a target reception power value; and
performing control on at least one of a first transmission power or a second transmission power according to the target reception power value, thereby enabling a difference between a first reception power and a second reception power to be less than a preset power threshold;
wherein
the first transmission power is a transmission power of a backhaul downlink (DL) signal transmitted by a donor gNB of a relay node to the relay node;
the second transmission power is a transmission power of an access uplink (UL) signal transmitted by a terminal device to the relay node;
the first reception power is a reception power when the backhaul DL signal from the donor gNB reaches the relay node; and
the second reception power is a reception power when the access UL signal from the terminal device reaches the relay node;
wherein when performing control on the first transmission power according to the target reception power value, thereby enabling the difference between the first reception power and the second reception power to be less than the preset power threshold, the program is executed by the processor to implement the steps of:
performing control on the first transmission power, thereby enabling a difference between the first reception power and the target reception power value to be less than a first preset power threshold; and
transmitting a first power adjustment instruction to the donor gNB; wherein the first power adjustment instruction is configured to instruct the donor gNB to increase or decrease the first transmission power, thereby enabling the difference between the first reception power and the target reception power value to be less than the preset power threshold.

15. The non-transitory computer readable storage medium according to claim 14, wherein when performing control on the second transmission power according to the target reception power value, thereby enabling the difference between the first reception power and the second reception power to be less than the preset power threshold, the program is executed by the processor to implement the steps of:
performing control on the second transmission power, thereby enabling a difference between the second reception power and the target reception power value to be less than a second preset power threshold.

16. The non-transitory computer readable storage medium according to claim 14, wherein when determining a target reception power value, the program is executed by the processor to implement steps of:
determining that the first reception power is the target reception power value;
wherein when performing control on at least one of the first transmission power or the second transmission power according to the target reception power value, thereby enabling the difference between the first reception power and the second reception power to be less than a preset power threshold, the program is executed by the processor to implement steps of:
performing control on the second transmission power, thereby enabling a difference between the second reception power and the target reception power value to be less than the preset power threshold; or,
wherein when determining the target reception power value, the program is executed by the processor to implement steps of:
determining that the second reception power is the target reception power value; wherein when performing control on at least one of the first transmission power or the second transmission power according to the target reception power value, thereby enabling the difference between the first reception power and the second reception power to be less than the preset power threshold, the program is executed by the processor to implement steps of:

performing control on the first transmission power, thereby enabling the difference between the first reception power and the target reception power value to be less than the preset power threshold.

17. The non-transitory computer readable storage medium according to claim 15, wherein when performing control on the first transmission power, the program is executed by the processor to implement steps of: transmitting the target reception power value to the donor gNB; wherein the target reception power value is used by the donor gNB to determine the first transmission power, and the first transmission power is determined by the target reception power value and a path loss of a backhaul link between the relay node and the donor gNB; the backhaul DL signal is transmitted on the backhaul link.

18. The non-transitory computer readable storage medium according to claim 15, wherein when performing control on the second transmission power, the program is executed by the processor to implement steps of:

transmitting a second power adjustment instruction to the terminal device;

wherein the second power adjustment instruction is configured to instruct the terminal device to increase or decrease the second transmission power, thereby enabling the difference between the second reception power and the target reception power value to be less than the preset power threshold.

19. The non-transitory computer readable storage medium according to claim 16, wherein before determining that the first reception power is the target reception power value, the program is executed by the processor to implement at least one of: measuring a reception power when the backhaul DL signal from the donor gNB reaches the relay node, to obtain the first reception power; or, receiving a signaling transmitted by the donor gNB, and determining the first reception power according to the signaling; wherein the signaling carries related information for determining the first reception power.

* * * * *